United States Patent
Peng et al.

(10) Patent No.: US 12,146,509 B2
(45) Date of Patent: Nov. 19, 2024

(54) DRIVEN GAS-LIQUID SEPARATION STARTING DEVICE

(71) Applicant: Jiangsu University, Jiangsu (CN)

(72) Inventors: Guangjie Peng, Jiangsu (CN); Long Tian, Jiangsu (CN); Hao Chang, Jiangsu (CN); Shiming Hong, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/022,521

(22) PCT Filed: Aug. 1, 2022

(86) PCT No.: PCT/CN2022/109339
§ 371 (c)(1),
(2) Date: Feb. 22, 2023

(87) PCT Pub. No.: WO2023/240762
PCT Pub. Date: Dec. 21, 2023

(65) Prior Publication Data
US 2024/0287991 A1    Aug. 29, 2024

(30) Foreign Application Priority Data

Jun. 17, 2022  (CN) .......................... 202210687332.6

(51) Int. Cl.
*F04D 9/02*    (2006.01)
*B01D 19/00*   (2006.01)
(Continued)

(52) U.S. Cl.
CPC ........... *F04D 9/02* (2013.01); *B01D 19/0042* (2013.01); *F04D 29/708* (2013.01)

(58) Field of Classification Search
CPC ...... F04D 9/02; F04D 29/708; B01D 19/0042
See application file for complete search history.

(56) References Cited

FOREIGN PATENT DOCUMENTS

| CN | 108894992 | 11/2018 |
|----|-----------|---------|
| CN | 110397599 | 11/2019 |

(Continued)

OTHER PUBLICATIONS

CN-114151354-A_English translation (Year: 2022).*

(Continued)

*Primary Examiner* — Youngsul Jeong
(74) *Attorney, Agent, or Firm* — JCIPRNET

(57) ABSTRACT

A driven gas-liquid separation starting device, a gas-liquid chamber is communicated with a pump channel, a rotation mechanism is arranged in the gas-liquid chamber; a second cam mechanism is arranged in a primary gas-liquid separation chamber, which is divided by a baffle and the second cam mechanism into primary gas-liquid separation units, spiral gas-liquid separation mechanisms in contact with the second cam mechanism are arranged the primary gas-liquid separation unit; a first cam mechanism is arranged in a self-priming chamber, a secondary gas-liquid separation chamber is in contact with a rolling pair through a supporting connecting rod, a volume of the secondary gas-liquid separation chamber is changed by rotation of the first cam mechanism, to carry out further gas-liquid separation on a mixed gas-liquid fluid with a high gas content obtained through separation in the primary gas-liquid separation chamber; an exhaust chamber is arranged on the self-priming chamber.

10 Claims, 7 Drawing Sheets

(51) Int. Cl.
    *F04D 29/00*    (2006.01)
    *F04D 29/70*    (2006.01)

(56)          References Cited

FOREIGN PATENT DOCUMENTS

| CN | 110397599 A | * | 11/2019 | ............ F04B 27/065 |
| CN | 113107858 | | 7/2021 | |
| CN | 113464450 | | 10/2021 | |
| CN | 215462663 U | * | 1/2022 | ............ B01D 45/14 |
| CN | 114151354 | | 3/2022 | |
| CN | 114151354 A | * | 3/2022 | ............... F04D 9/00 |
| CN | 114370404 | | 4/2022 | |
| GB | 370166 | | 4/1932 | |

OTHER PUBLICATIONS

CN-215462663-U_English translation (Year: 2022).*
CN-110397599-A_English translation (Year: 2019).*
"International Search Report (Form PCT/ISA/210) of PCT/CN2022/109339," mailed on Oct. 26, 2022, pp. 1-5.
"Written Opinion of the International Searching Authority (Form PCT/ISA/237) of PCT/CN2022/109339," mailed on Oct. 26, 2022, pp. 1-4.

* cited by examiner

US 12,146,509 B2

DRIVEN GAS-LIQUID SEPARATION STARTING DEVICE

CROSS-REFERENCE TO RELATED APPLICATION

This application is a 371 of international application of PCT application serial no. PCT/CN2022/109339, filed on Aug. 1, 2022, which claims the priority benefit of China application no. 202210687332.6, filed on Jun. 17, 2022. The entirety of each of the above-mentioned patent applications is hereby incorporated by reference herein and made a part of this specification.

TECHNICAL FIELD

The present disclosure relates to the field of gas-liquid separation self-priming devices, and particularly to a driven gas-liquid separation starting device.

TECHNICAL BACKGROUND

As an important fluid machinery, centrifugal pumps are widely used in daily life, agriculture, medical field, industry, and other fields. However, centrifugal pumps currently available on the market require feeding the pump chamber with water before starting. The operation is complex and time-consuming. If a vacuum pump is connected to the centrifugal pump for vacuuming, large noise and high energy consumption are caused. Moreover, gas-liquid mixing in the pump chamber may damage the hydraulic components inside the pump chamber, posing a potential safety hazard.

SUMMARY OF THE INVENTION

To overcome the drawbacks in the prior art, the present disclosure provides a driven gas-liquid separation starting device. The device of the present disclosure is driven by electric power as well as gas and liquid, different from conventional devices which are driven only by electric power, thereby greatly reducing energy consumption. The device of the present disclosure is easy to operate and can take advantage of its own structure to rapidly complete the processes of air suction, air exhaust, and gas-liquid separation during starting. The arrangement of the different levels of separation devices ensures that the gas is completely discharged. After the device stops running, the pipeline can be closed automatically, so that the chamber is always filled with water. When started again, the centrifugal pump directly enters a normal operating state, thereby reducing energy consumption, prolonging the service life, and improving the operational efficiency.

The above technical object of the present disclosure is attained with the following technical means.

A driven gas-liquid separation starting device is provided, including: a housing; and a gas-liquid chamber, a primary gas-liquid separation chamber, a secondary gas-liquid separation chamber, and a self-priming chamber arranged in the housing and communicated in sequence, where
  the gas-liquid chamber is communicated with a pump channel, a rotation mechanism is arranged in the gas-liquid chamber, and the rotation mechanism is driven by a mixed gas-liquid fluid in the pump channel to rotate; a second cam mechanism is arranged in the primary gas-liquid separation chamber, the second cam mechanism is connected to an output shaft of the rotation mechanism, the primary gas-liquid separation chamber is divided by a baffle of the primary gas-liquid separation chamber and the second cam mechanism into a plurality of primary gas-liquid separation units, a plurality of spiral gas-liquid separation mechanisms in contact with the second cam mechanism are arranged in each of the primary gas-liquid separation units, and the spiral gas-liquid separation mechanisms are driven by rotation of the second cam mechanism to cut the mixed gas-liquid fluid;
  a first cam mechanism is arranged in the self-priming chamber, the secondary gas-liquid separation chamber is in contact with a rolling pair of the first cam mechanism through a supporting connecting rod, and a volume of the secondary gas-liquid separation chamber is changed by rotation of the first cam mechanism, to carry out further gas-liquid separation on the mixed gas-liquid fluid with a high gas content obtained through separation in the primary gas-liquid separation chamber; and an exhaust chamber for exhausting gas is arranged on the self-priming chamber.

Further, the primary gas-liquid separation units include an inner chamber of the primary gas-liquid separation chamber, a middle chamber of the primary gas-liquid separation chamber, and an outer chamber of the primary gas-liquid separation chamber; the middle chamber of the primary gas-liquid separation chamber is spaced apart from the outer chamber of the primary gas-liquid separation chamber by an inner wall of the primary gas-liquid separation chamber, the inner chamber of the primary gas-liquid separation chamber is defined in the middle chamber of the primary gas-liquid separation chamber by a bent baffle; the bent baffle is provided with an air outlet of the bent baffle for communicating the inner chamber of the primary gas-liquid separation chamber with the middle chamber of the primary gas-liquid separation chamber; the inner wall of the primary gas-liquid separation chamber is provided with an air outlet for communicating the middle chamber of the primary gas-liquid separation chamber with the outer chamber of the primary gas-liquid separation chamber; the outer chamber of the primary gas-liquid separation chamber is communicated with the secondary gas-liquid separation chamber;
  the second cam mechanism includes a concave-convex rotary disc, the concave-convex rotary disc is connected to the output shaft of the rotation mechanism, and the concave-convex rotary disc is provided with a disc outlet for communicating the gas-liquid chamber with the inner chamber of the primary gas-liquid separation chamber; a slide rail of the concave-convex rotary disc is arranged on an outer contour of the concave-convex rotary disc; one end of the bent baffle is mounted in the slide rail of the concave-convex rotary disc through a slide rail device of the bent baffle;
  the spiral gas-liquid separation mechanism is arranged at a middle portion of an end of the inner chamber of the primary gas-liquid separation chamber adjacent to the concave-convex rotary disc; the spiral gas-liquid separation mechanism includes a spiral gas-liquid separator and a constriction/expansion tooth movement device; the constriction/expansion tooth movement device includes a balance plate, a constriction/expansion tooth movement peripheral spring, a constriction/expansion tooth movement fixed support, and a balance plate ball; the constriction/expansion tooth movement fixed support is fixed to an inner wall surface of the inner chamber of the primary gas-liquid separation chamber; a screw shaft of the spiral gas-liquid separator is engaged with a screw pair of the constriction/expansion tooth movement fixed support; a bottom of the screw shaft is in contact with a contour of the concave-convex rotary disc; a bottom of the constriction/expansion tooth movement fixed support is connected to one end of the constriction/expansion tooth movement peripheral spring; an other end of the constriction/expansion tooth movement peripheral spring is fixed to the balance plate; and the balance plate is mounted on the screw shaft through the balance plate ball.

Further, the slide rail device of the bent baffle includes a spring of the bent baffle, a damping telescopic rod, a slide rail support of the bent baffle, and a slide rail ball of the bent baffle, the damping telescopic rod is mounted on one end of the bent baffle, a rod head of the damping telescopic rod is in contact with the slide rail support of the bent baffle, the slide rail ball of the bent baffle is arranged at a bottom of the slide rail support of the bent baffle, the slide rail ball of the bent baffle is located inside the slide rail of the concave-convex rotary disc, and the slide rail support of the bent baffle is configured to limit a movement of the slide rail ball of the bent baffle in the slide rail of the concave-convex rotary disc; the spring of the bent baffle is located between the bent baffle and the slide rail support of the bent baffle;

one end of the baffle of the primary gas-liquid separation chamber is connected to the housing, an other end of the baffle of the primary gas-liquid separation chamber is connected to a baffle spring of the primary gas-liquid separation chamber, a bottom of the baffle spring of the primary gas-liquid separation chamber is connected to a disc slide rail ball, the disc slide rail ball is located inside the slide rail of the concave-convex rotary disc, and a movement of the disc slide rail ball in the slide rail of the concave-convex rotary disc is limited by a limit plate.

Further, the gas-liquid chamber includes a left flow channel, a right flow channel, a fixed support, a separator driving device, and a concave-convex rotary disc bracket; the fixed support is located at an entrance of the gas-liquid chamber and the pump channel; the fixed support divides the entrance into the left flow channel and the right flow channel; both the left flow channel and the right flow channel gradually shrink, and an exit of the left flow channel is higher than an exit of the right flow channel; the exit of the left flow channel points to a distant wall surface of the gas-liquid chamber along a tangent direction of wall surface; the exit of the right flow channel points to a near wall surface of the gas-liquid chamber along the tangent direction of wall surface; one end of the separator driving device is supported by the fixed support, and an other end of the separator driving device is connected to the concave-convex rotary disc through the concave-convex rotary disc bracket; and the separator driving device is a spiral separator.

Further, the primary gas-liquid separation unit further includes a primary discharge hole, a secondary discharge hole, a rotary disc impeller, and a conical gas-liquid separator;

the primary discharge hole is located between the gas-liquid chamber and the inner chamber of the primary gas-liquid separation chamber, and the primary discharge hole is configured for inputting a liquid separated in the inner chamber of the primary gas-liquid separation chamber into the gas-liquid chamber in a one-way manner;

the secondary discharge hole is located between the outer chamber of the primary gas-liquid separation chamber and the middle chamber of the primary gas-liquid separation chamber, and the secondary discharge hole is configured for inputting a liquid separated in the middle chamber of the primary gas-liquid separation chamber into the outer chamber of the primary gas-liquid separation chamber in a one-way manner;

the conical gas-liquid separator is mounted in the outer chamber of the primary gas-liquid separation chamber through a support of the conical gas-liquid separator, and the conical gas-liquid separator is adjacent to the air outlet; the rotary disc impeller is arranged in the disc outlet; and an impeller of the bent baffle is arranged in the air outlet of the bent baffle.

Further, a blade of the spiral gas-liquid separator exhibits a tendency of expanding first and then constricting, and an expansion angle and a constriction angle of the blade are both 30°; and a shrinkage angle of a blade of the conical gas-liquid separator is 50°.

Further, a cavity between an exterior of the secondary gas-liquid separation chamber and the housing is an air intake pipeline; the secondary gas-liquid separation chamber includes a tetrahedron, a one-way intake valve, a shaft rod spring, a shaft rod rotor, and a one-way outlet valve; the secondary gas-liquid separation chamber is tetrahedral; the tetrahedron includes a first wall surface, a second wall surface, a third wall surface, and a fourth wall surface; the first wall surface is connected to the second wall surface through a first shaft rod rotor; the first shaft rod rotor is connected to one end of the supporting connecting rod; the first wall surface is connected to the third wall surface through a second shaft rod rotor; the second wall surface is connected to the fourth wall surface through a third shaft rod rotor; a shaft rod spring is arranged on each of two ends of the second shaft rod rotor and the third shaft rod rotor; the second shaft rod rotor and the third shaft rod rotor are respectively slidably mounted on fixed shaft rods on two sides; a one-way intake valve is arranged on each of the third wall surface and the fourth wall surface to communicate the primary gas-liquid separation chamber with the secondary gas-liquid separation chamber; a one-way outlet valve is arranged on each of the first wall surface and the second wall surface to communicate the secondary gas-liquid separation chamber with the air intake pipeline; a wall surface of the tetrahedron is provided with a tertiary discharge hole for inputting a liquid separated in the secondary gas-liquid separation chamber into the gas-liquid chamber in a one-way manner; and the cavity between the exterior of the secondary gas-liquid separation chamber and the housing is the air intake pipeline, and the air intake pipeline is communicated with the self-priming chamber through a one-way channel.

Further, the self-priming chamber includes a rotary cam, a cam slide rail, a fixed hub device, and a plate chamber connecting rod;

the rotary cam is located at a center of the self-priming chamber, and the rotary cam is driven by a power unit to rotate; the cam slide rail is arranged on a contour of the rotary cam; an other end of the supporting connecting rod is in contact with the rotary cam through the fixed hub device; one end of the plate chamber connecting rod is in contact with the rotary cam through the fixed hub device; an other end of the plate chamber connecting rod is connected to an exhaust device in the exhaust chamber, to drive the exhaust device to operate; and the fixed hub device includes a hub shell and a hub ball, the hub ball is arranged in the hub shell, the hub ball is located in the cam slide rail, and the hub shell is configured for limiting a movement of the hub ball in the cam slide rail.

Further, the exhaust chambers are symmetrically distributed on two sides of the self-priming chamber; the exhaust chamber is L-shaped; the exhaust chamber includes a communicating channel, an inlet check valve of the exhaust chamber, an inner chamber of the exhaust chamber, an outer chamber of the exhaust chamber, an inner and outer chamber outlet impeller, an impeller separator connecting rod of a trapezoidal gas-liquid separation device, a trapezoidal gas-liquid separator impeller, and an outlet check valve of the exhaust chamber;

the communicating channel is configured for communicating the self-priming chamber with the outer chamber of the exhaust chamber; a chamber in the communicating channel is the inner chamber of the exhaust chamber; a trapezoidal gas-liquid separator is arranged in the outer chamber of the exhaust chamber, and the impeller separator connecting rod is arranged in the trapezoidal gas-liquid separator; one end of the impeller separator connecting rod is fixed to the trapezoidal gas-liquid separator impeller, and an other end of the impeller separator connecting rod is supported in the outer chamber of the exhaust chamber by a support base; the outlet check valve of the exhaust chamber is arranged on a top of the exhaust chamber; an other end of the impeller separator connecting rod is connected to an other end of the plate chamber connecting rod through a crank-slider mechanism; the impeller separator connecting rod is driven to rotate by reciprocation of the plate chamber connecting rod;

the plate chamber connecting rod is movably mounted in the communicating channel; the inlet check valve of the exhaust chamber is arranged in the inner chamber of the exhaust chamber; the inlet check valve of the exhaust chamber is mounted in the plate chamber connecting rod; the inlet check valve of the exhaust chamber is opened or closed through reciprocation of the plate chamber connecting rod; the communicating channel is provided with an inner and outer chamber outlet communicated with the outer chamber of the exhaust chamber; and the inner and outer chamber outlet impeller is mounted in the inner and outer chamber outlet.

Further, a bottom of the outer chamber of the exhaust chamber is provided with a quaternary discharge hole, and the quaternary discharge hole is configured for communicating the outer chamber of the exhaust chamber with the self-priming chamber; a top end of an exhaust chamber outer wall surface of the outer chamber of the exhaust chamber gradually shrinks with a shrinkage angle of 15°; a tilt angle of a bottom of the exhaust chamber outer wall surface relative to a horizontal plane is 30°; and the trapezoidal gas-liquid separator is tapered, and a taper angle of the trapezoidal gas-liquid separator is 10°.

The beneficial effects of the present disclosure are as follows.

1. The driven gas-liquid separation starting device of the present disclosure can be mounted on the pump channel. The air suction, air exhaust, and gas-liquid separation during the whole operation process occur at a front end of the pump chamber, to eliminate gas in the flow channel and reduce vibration and noise generated in the pump body, thereby reducing the damage caused by the two-phase flow to the pump body, and greatly improving the stability of the operation process.

2. The driven gas-liquid separation starting device of the present disclosure is driven by electric power as well as gas and liquid, different from conventional devices which are driven only by electric power. A high-speed air flow generated in the pump channel drives the separator driving device to rotate to generate kinetic energy, and a motor drives the rotary cam to rotate to generate a pressure difference to cause the device to carry out air suction, air exhaust, and gas-liquid separation, thereby greatly reducing energy consumption. One complete air suction and exhaust process can be completed each time the rotary cam rotates 90°. The combination of the concave-convex structure of the rotary cam and the fixed hub device ensures the smoothness of operation of the device and greatly improves the stability of the self-priming process.

3. In the driven gas-liquid separation starting device of the present disclosure, the concave-convex rotary disc is used in combination with the expandable gas-liquid separation chamber. The rotation of the concave-convex rotary disc drives the spiral gas-liquid separator to move, to periodically change the volume of the primary gas-liquid separation chamber to complete the gas-liquid separation process. The cooperation of the plurality of impellers arranged in the primary gas-liquid separation chamber with the chambers not only can greatly improve the efficiency of gas-liquid separation, but also can prevent the concentration of separation surfaces to aggravate the damage to the device.

4. In the driven gas-liquid separation starting device of the present disclosure, the rotary cam in the self-priming chamber is used to drive the plate chamber connecting rod and the supporting connecting rod to reciprocate. The plate chamber connecting rod drives the trapezoidal gas-liquid separator to rotate through the crank-slider mechanism for gas-liquid separation. The supporting connecting rod drives an upper wall surface of the secondary gas-liquid separation chamber to reciprocate to change the volume for air suction and air exhaust, thereby improving the efficiency of gas-liquid separation.

5. The driven gas-liquid separation starting device of the present disclosure adopts the combination of two levels of gas-liquid separation chambers for separation. The primary gas-liquid separation chamber is used to screen the mixed gas-liquid fluid preliminarily by cutting. The secondary gas-liquid separation chamber is used to change the volume to, on the one hand, carry out further gas-liquid separation on the mixed gas-liquid fluid with a high gas content obtained through separation in the primary gas-liquid separation chamber, and on the other hand, generate a pressure difference to drive the upper and lower devices to operate.

BRIEF DESCRIPTION OF THE DRAWINGS

In order to more clearly explain the technical solutions in the embodiments of the present disclosure or in the prior art, the drawings used in the description of the embodiments or the prior art will be briefly described below. Obviously, the drawings depicted below are merely embodiments of the present disclosure, and those skilled in the art can obtain other drawings based on these drawings without any creative efforts.

In the drawings.

Figure 1:
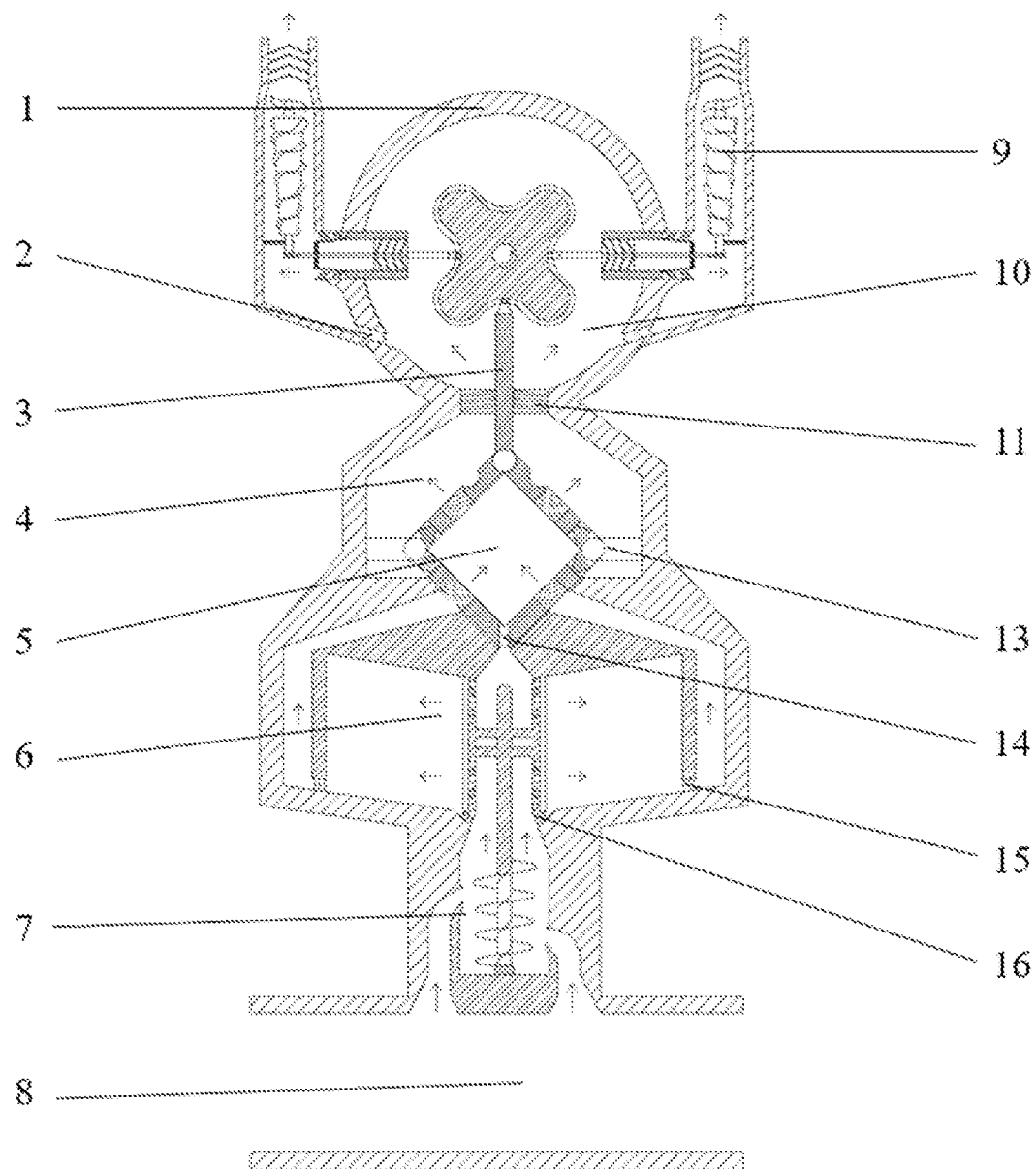
FIG. 1 is a schematic structural diagram of a driven gas-liquid separation starting device according to the present disclosure.

1—housing; 2—quaternary discharge hole; 3—supporting connecting rod; 4—air intake pipeline; 5—secondary gas-liquid separation chamber; 51—shaft rod rotor; 52—one-way outlet valve; 53—one-way intake valve; 54—tetrahedron; 55—shaft rod spring; 6—primary gas-liquid separation chamber; 61—outer chamber of primary gas-liquid separation chamber; 611—support of conical gas-liquid separator; 612—conical gas-liquid separator; 614—air outlet; 62—middle chamber of primary gas-liquid separation chamber; 63—slide rail of concave-convex rotary disc; 64—inner chamber of primary gas-liquid separation chamber; 641—spiral gas-liquid separator; 642—impeller of bent baffle; 643—air outlet of bent baffle; 644—bent baffle; 645—constriction/expansion tooth movement device; 6451—balance plate; 6452—constriction/expansion tooth movement peripheral spring; 6453—constriction/expansion tooth movement fixed support; 6454—screw shaft; 6455—balance plate ball; 646—slide rail device of bent baffle; 6461—slide rail ball of bent baffle; 6462—spring of bent baffle; 6463—slide rail support of bent baffle; 6464—damping telescopic rod; 65—baffle of primary gas-liquid separation chamber; 66—baffle spring of primary gas-liquid separation chamber; 67—disc slide rail ball; 68 concave-convex rotary disc; 69—disc outlet; 610—rotary disc impeller; 615—rubber bushing; 616—inner wall of primary gas-liquid separation chamber; 7—gas-liquid chamber; 71—separator driving device; 72—left flow channel; 73—concave-convex rotary disc bracket; 74—right flow channel; 75—fixed support; 76—winged flat plate; 8—pump channel; 9—exhaust chamber; 91—exhaust chamber outer wall surface; 92—outlet check valve of exhaust chamber; 93—trapezoidal gas-liquid separator impeller; 94—impeller separator connecting rod; 95—trapezoidal gas-liquid separator; 96—crank-slider mechanism; 97—outer chamber of exhaust chamber; 98—inner chamber of exhaust chamber; 99—communicating channel; 910—inlet check valve of exhaust chamber; 911—inner and outer chamber outlet; 912—inner and outer chamber outlet impeller; 913 support base; 10—self-priming chamber; 101—rotary cam; 102—cam slide rail; 103—fixed hub device; 1031—hub ball; 1032—hub shell; 104—plate chamber connecting rod; 11—one-way channel; 13—fixed shaft rod; 14—tertiary discharge hole; 15—secondary discharge hole; 16—primary discharge hole.

DETAILED DESCRIPTION OF THE EMBODIMENTS

The present disclosure will be further described in detail below with reference to drawings and embodiments, but the protection scope of the present disclosure is not limited thereto.

Embodiments of the present disclosure will be exemplarily described in detail hereinafter with reference to accompanying drawings in which the same or like reference characters refer to the same or like elements or elements having the same or like functions throughout. The embodiments described below with reference to accompanying drawings are exemplary, and intended to explain, instead of limiting the present disclosure.

In the description of the present disclosure, it should be understood that the orientation or positional relationships indicated by the terms "center", "longitudinal", "transverse", "length", "width", "thickness", "upper", "lower", "axial", "radial", "vertical", "horizontal", "inner", "outer", etc. are based on the orientation or positional relationships shown in the drawings, and are only for the convenience of describing the present disclosure and simplifying the description, rather than indicating or implying that the apparatus or element described must have a specific orientation or be constructed and operated in a specific orientation, and therefore are not to be construed as limiting the present disclosure. Moreover, the terms "first" and "second" are used herein for purposes of description, and are not intended to indicate or imply relative importance or implicitly point out the number of the indicated technical feature. Therefore, the features defined by "first" and "second" may explicitly or implicitly include one or more features. In the description of the present disclosure, "plural" means two or more, unless it is defined otherwise specifically.

In the present disclosure, unless otherwise clearly specified and defined, the terms "mount", "connect", "couple", "fix" and variants thereof should be interpreted in a broad sense, for example, may be a fixed connection, a detachable connection, or an integral connection; may be a mechanical connection or an electrical connection; or may be a direct connection, an indirectly connection via an intermediate medium, or communication between the interiors of two components. For those of ordinary skill in the art, the specific meanings of the above terms in the present disclosure can be understood according to specific circumstances.

As shown in FIG. 1, a driven gas-liquid separation starting device of the present disclosure includes a housing 1; and a gas-liquid chamber 7, a primary gas-liquid separation chamber 6, a secondary gas-liquid separation chamber 5, and a self-priming chamber 10 arranged in the housing 1 and communicated in sequence.

The gas-liquid chamber 7 is communicated with a pump channel 8, a rotation mechanism is arranged in the gas-liquid chamber 7, and the rotation mechanism is driven by a mixed gas-liquid fluid in the pump channel 8 to rotate. A second cam mechanism is arranged in the primary gas-liquid separation chamber 6. The second cam mechanism is connected to an output shaft of the rotation mechanism. The primary gas-liquid separation chamber 6 is divided by a baffle 65 of the primary gas-liquid separation chamber and the second cam mechanism into a plurality of primary gas-liquid separation units. A plurality of spiral gas-liquid separation mechanisms in contact with the second cam mechanism are arranged in each of the primary gas-liquid separation units.

The spiral gas-liquid separation mechanisms are driven by rotation of the second cam mechanism to cut the mixed gas-liquid fluid.

A first cam mechanism is arranged in the self-priming chamber 10. The secondary gas-liquid separation chamber 5 is in contact with a rolling pair of the first cam mechanism through a supporting connecting rod 3. A volume of the secondary gas-liquid separation chamber 5 is changed by rotation of the first cam mechanism, to carry out further gas-liquid separation on the mixed gas-liquid fluid with a high gas content obtained through separation in the primary gas-liquid separation chamber 6. Exhaust chambers 9 are arranged on left and right sides of the self-priming chamber 10, and are of a cylindrical tapered structure for exhausting gas.

Figure 6:
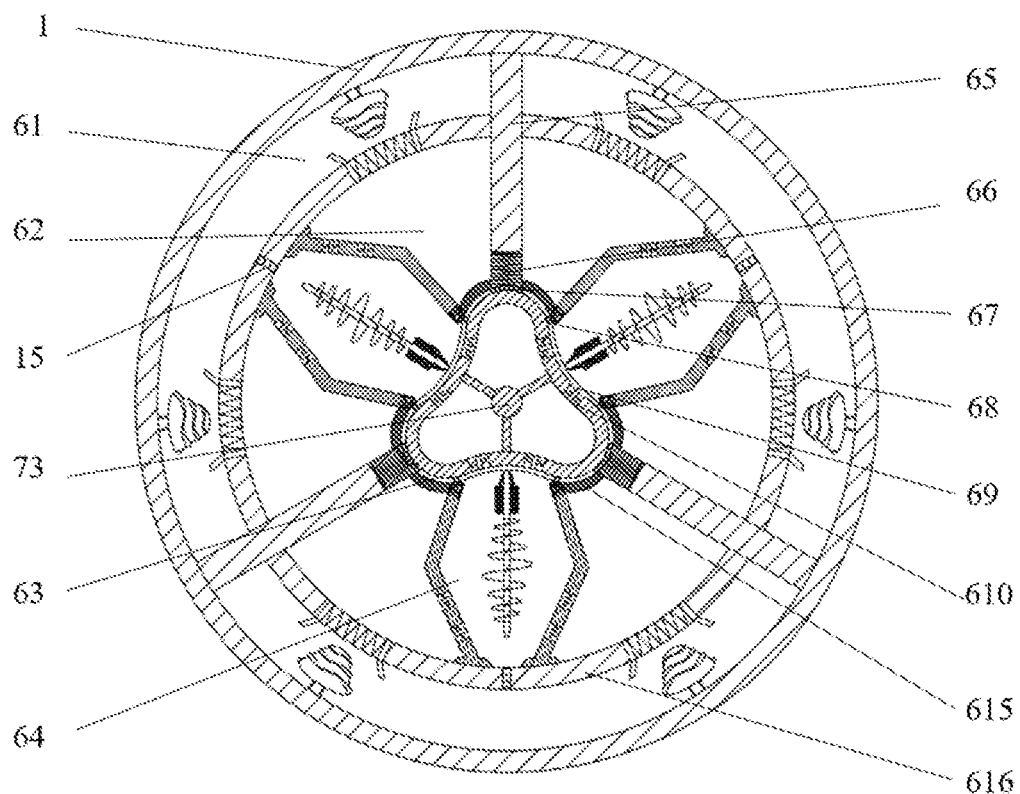
FIG. 6 is a schematic structural diagram of a primary gas-liquid separation chamber according to the present disclosure.
Figure 7:
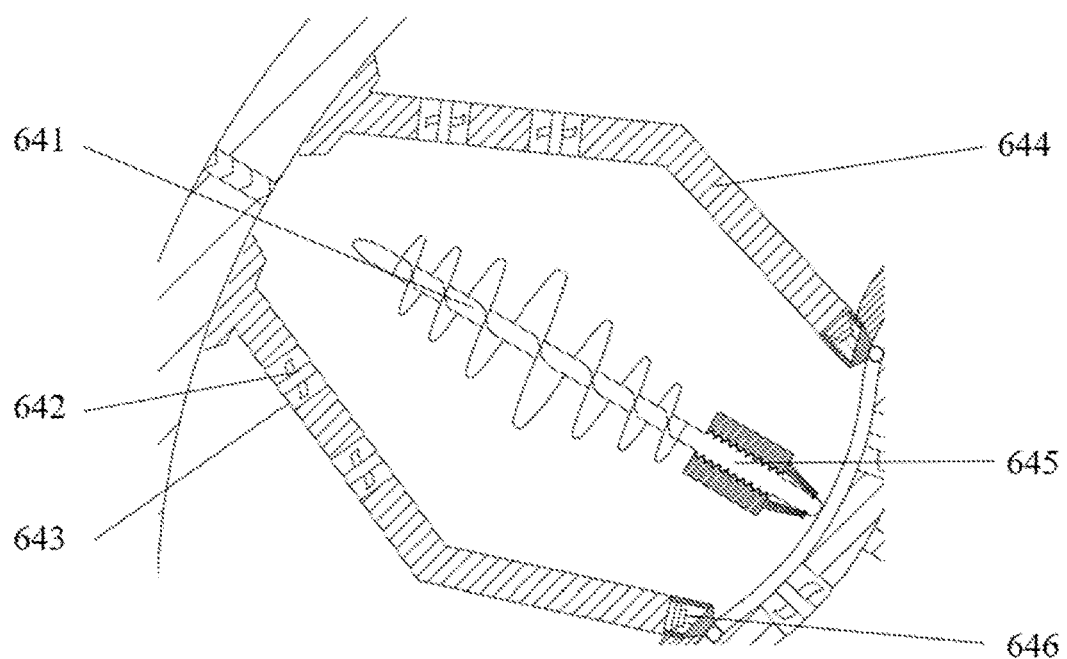
FIG. 7 is a partial enlarged view of an inner chamber of a primary gas-liquid separation chamber according to the present disclosure.

As shown in FIG. 1, FIG. 6, and FIG. 7, the primary gas-liquid separation chamber 6 is divided by the baffle 65 of the primary gas-liquid separation chamber and the second cam mechanism into three primary gas-liquid separation units. The primary gas-liquid separation unit includes an inner chamber 64 of the primary gas-liquid separation chamber, a middle chamber 62 of the primary gas-liquid separation chamber, and an outer chamber 61 of the primary gas-liquid separation chamber. The inner chamber 64 of the primary gas-liquid separation chamber, the middle chamber 62 of the primary gas-liquid separation chamber, and the outer chamber 61 of the primary gas-liquid separation chamber are arranged from inside to outside along a flow direction. The middle chamber 62 of the primary gas-liquid separation chamber is spaced apart from the outer chamber 61 of the primary gas-liquid separation chamber by an inner wall 616 of the primary gas-liquid separation chamber. The inner chamber 64 of the primary gas-liquid separation chamber is defined in the middle chamber 62 of the primary gas-liquid separation chamber by a bent baffle 644. The bent baffle 644 is provided with an air outlet 643 of the bent baffle for communicating the inner chamber 64 of the primary gas-liquid separation chamber with the middle chamber 62 of the primary gas-liquid separation chamber. The inner wall 616 of the primary gas-liquid separation chamber is provided with an air outlet 614 for communicating the middle chamber 62 of the primary gas-liquid separation chamber with the outer chamber 61 of the primary gas-liquid separation chamber. The outer chamber 61 of the primary gas-liquid separation chamber is communicated with the secondary gas-liquid separation chamber 5.

As shown in FIG. 6, the second cam mechanism includes a concave-convex rotary disc 68. The concave-convex rotary disc 68 is connected to the output shaft of the rotation mechanism. The concave-convex rotary disc 68 is of a regular triangular concave-convex shape. Each contour edge of the concave-convex rotary disc 68 is provided with a disc outlet 69 for communicating the gas-liquid chamber 7 with the inner chamber 64 of the primary gas-liquid separation chamber. A slide rail 63 of the concave-convex rotary disc 68 is arranged on an outer contour of the concave-convex rotary disc 68. One end of the bent baffle 644 is mounted in the slide rail 63 of the concave-convex rotary disc through a slide rail device 646 of the bent baffle. An other end of the bent baffle 644 is mounted on the inner wall 616 of the primary gas-liquid separation chamber.

Figure 8:
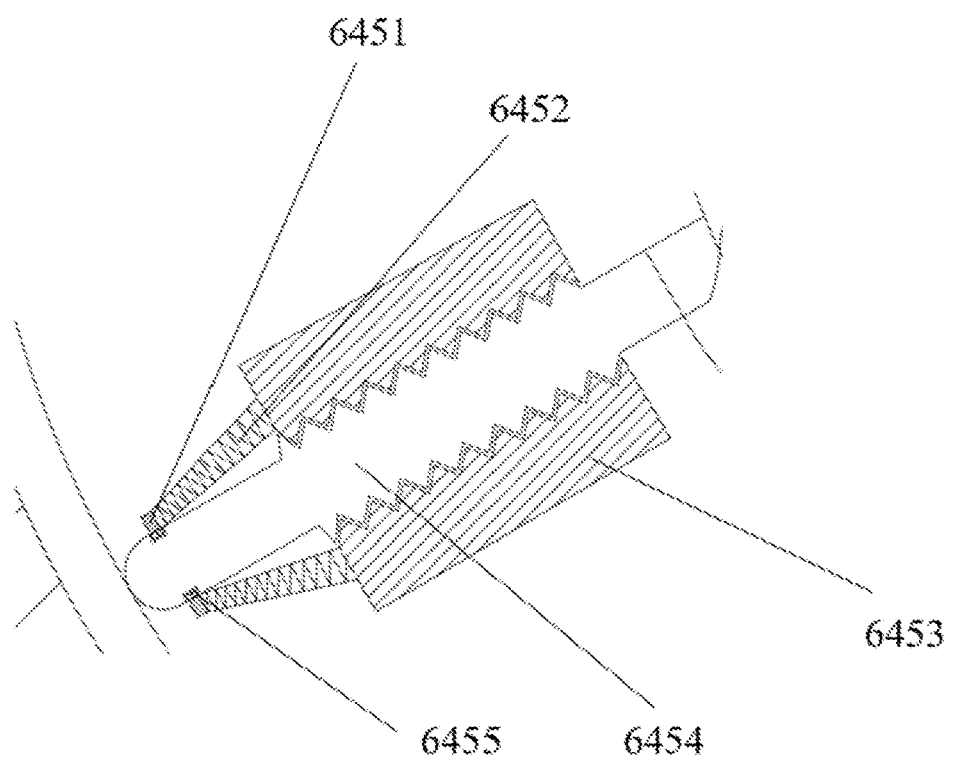
FIG. 8 is an enlarged structural diagram of a constriction/expansion tooth movement device according to the present disclosure.

As shown in FIG. 7 and FIG. 8, the spiral gas-liquid separation mechanism is arranged at a middle portion of an end of the inner chamber 64 of the primary gas-liquid separation chamber adjacent to the concave-convex rotary disc 68. The spiral gas-liquid separation mechanism includes a spiral gas-liquid separator 641 and a constriction/expansion tooth movement device 645. The constriction/expansion tooth movement device 645 includes a balance plate 6451, a constriction/expansion tooth movement peripheral spring 6452, a constriction/expansion tooth movement fixed support 6453, and a balance plate ball 6455. The constriction/expansion tooth movement fixed support 6453 is fixed to an inner wall surface of the inner chamber 64 of the primary gas-liquid separation chamber. A screw shaft 6454 of the spiral gas-liquid separator 641 is engaged with a screw pair of the constriction/expansion tooth movement fixed support 6453. A bottom of the screw shaft 6454 is in contact with a contour of the concave-convex rotary disc 68, and a bottom end of the screw shaft 6454 is hemispherical. A bottom of the constriction/expansion tooth movement fixed support 6453 is connected to one end of the constriction/expansion tooth movement peripheral spring 6452. An other end of the constriction/expansion tooth movement peripheral spring 6452 is fixed to the balance plate 6451. The balance plate 6451 is mounted on the screw shaft 6454 through the balance plate ball 6455. The rotation of the concave-convex rotary disc 68 causes the screw shaft 6454 to reciprocate linearly. When the screw shaft 6454 moves linearly in the constriction/expansion tooth movement fixed support 6453, the engagement between the screw shaft 6454 and the constriction/expansion tooth movement fixed support 6453 allows for the screw shaft 6454 to rotate. At the same time, the rotation of the screw shaft 6454 drives one end of the constriction/expansion tooth movement peripheral spring 6452 to rotate simultaneously to generate a torque at an other end of the constriction/expansion tooth movement peripheral spring 6452. The other end of the constriction/expansion tooth movement peripheral spring 6452 is mounted on the screw shaft 6454 through the balance plate ball 6455. The other end of the constriction/expansion tooth movement peripheral spring 6452 may rotate under the torque, to ensure that the constriction/expansion tooth movement peripheral spring 6452 does not experience severe torsional deformation. Slight torsional deformation of the constriction/expansion tooth movement peripheral spring 6452 is allowed by the design, and can provide a counter torque required for resetting of the screw shaft 6454.

Figure 9:
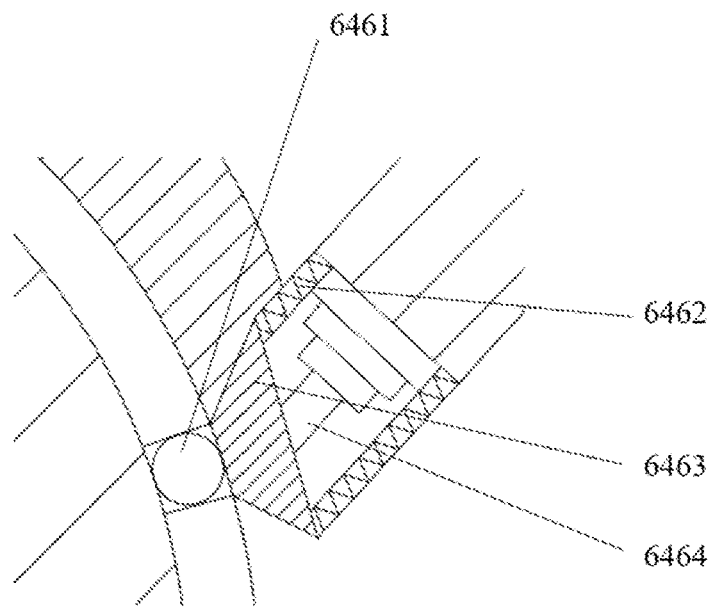
FIG. 9 is an enlarged structural diagram of a slide rail device of a bent baffle according to the present disclosure.

As shown in FIG. 7 and FIG. 9, the slide rail device 646 of the bent baffle includes a spring 6462 of the bent baffle, a damping telescopic rod 6464, a slide rail support 6463 of the bent baffle, and a slide rail ball 6461 of the bent baffle. The damping telescopic rod 6464 is mounted on one end of the bent baffle 644. A rod head of the damping telescopic rod 6464 is in contact with the slide rail support 6463 of the bent baffle. The slide rail ball 6461 of the bent baffle is arranged at a bottom of the slide rail support 6463 of the bent baffle. The slide rail ball 6461 of the bent baffle is located inside the slide rail 63 of the concave-convex rotary disc. The slide rail support 6463 of the bent baffle is configured to limit a movement of the slide rail ball 6461 of the bent baffle in the slide rail 63 of the concave-convex rotary disc. To be specific, the slide rail ball 6461 of the bent baffle only rotates on its own axis during the rotation of the concave-convex rotary disc 68, and does not move along with the rotation of the concave-convex rotary disc 68. The spring 6462 of the bent baffle is located between the bent baffle 644 and the slide rail support 6463 of the bent baffle.

One end of the baffle 65 of the primary gas-liquid separation chamber is connected to the housing 1. An other end of the baffle 65 of the primary gas-liquid separation chamber is connected to a baffle spring 66 of the primary gas-liquid separation chamber. A bottom of the baffle spring 66 of the primary gas-liquid separation chamber is connected to a disc slide rail ball 67. The disc slide rail ball 67 is located inside the slide rail 63 of the concave-convex rotary disc. A movement of the disc slide rail ball 67 in the slide rail 63 of the concave-convex rotary disc is limited by a limit plate. A layer of collapsible rubber bushing 615 is attached to the joint between the middle chamber 62 of the primary gas-liquid separation chamber and the slide rail 63 of the concave-convex rotary disc to prevent gas leakage.

Figure 10:
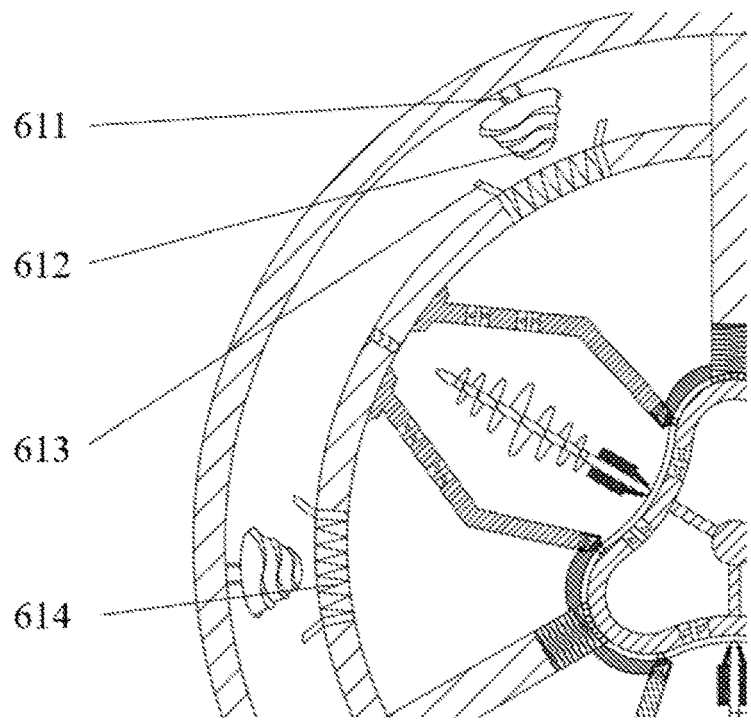
FIG. 10 is an enlarged structural diagram of an outer chamber of a primary gas-liquid separation chamber according to the present disclosure.

The primary gas-liquid separation unit further includes a primary discharge hole 16, a secondary discharge hole 15, a rotary disc impeller 610, and a conical gas-liquid separator 612. The primary discharge hole 16 is located between the gas-liquid chamber 7 and the inner chamber 64 of the primary gas-liquid separation chamber. The primary discharge hole 16 is configured for inputting a liquid separated in the inner chamber 64 of the primary gas-liquid separation chamber into the gas-liquid chamber 7 in a one-way manner. The secondary discharge hole 15 is located between the outer chamber 61 of the primary gas-liquid separation chamber and the middle chamber 62 of the primary gas-liquid separation chamber. The secondary discharge hole 15 is configured for inputting a liquid separated in the middle chamber 62 of the primary gas-liquid separation chamber into the outer chamber 61 of the primary gas-liquid separation chamber in a one-way manner. As shown in FIG. 10, the conical gas-liquid separator 612 is mounted in the outer chamber 61 of the primary gas-liquid separation chamber through a support 611 of the conical gas-liquid separator, and the conical gas-liquid separator 612 is adjacent to the air outlet 614. The rotary disc impeller 610 is arranged in the disc outlet 69. An impeller 642 of the bent baffle is arranged in the air outlet 643 of the bent baffle.

Optionally, the rotary disc impellers 610 are distributed on left and right sides of a most concave part of the concave-convex rotary disc 68, four impellers are arranged vertically on each side, and a total of 24 impellers are arranged on the three sides of the concave-convex rotary disc 68. A blade of the spiral gas-liquid separator 641 exhibits a tendency of expanding first and then constricting, and an expansion angle and a constriction angle of the blade are both 30°. An angle between a middle portion and two ends of the bent baffle 644 is 150°. On an outer end of the bent baffle 644, two impellers 642 of the bent baffle are arranged transversely, and four impellers 642 of the bent baffle are evenly arranged longitudinally. The bent baffle 644 is longitudinally symmetrically distributed about a central axis of the spiral gas-liquid separator 641. Therefore, a total of 48 impellers 642 of the bent baffle are arranged in the primary gas-liquid separation chamber 6. Six rubber bushings 615 are arranged. The conical gas-liquid separator 612 is narrow at the top and wide at the bottom, with a shrinkage angle of 50°. Twelve conical gas-liquid separators 612 are arranged in two sets longitudinally, and the six conical gas-liquid separators 612 in each set are evenly arranged horizontally. There are a total of three baffle springs 66 of the primary gas-liquid separation chamber, a total of twelve springs 6462 of the bent baffle, and a total of six constriction/expansion tooth movement peripheral springs 6452.

Figure 11:
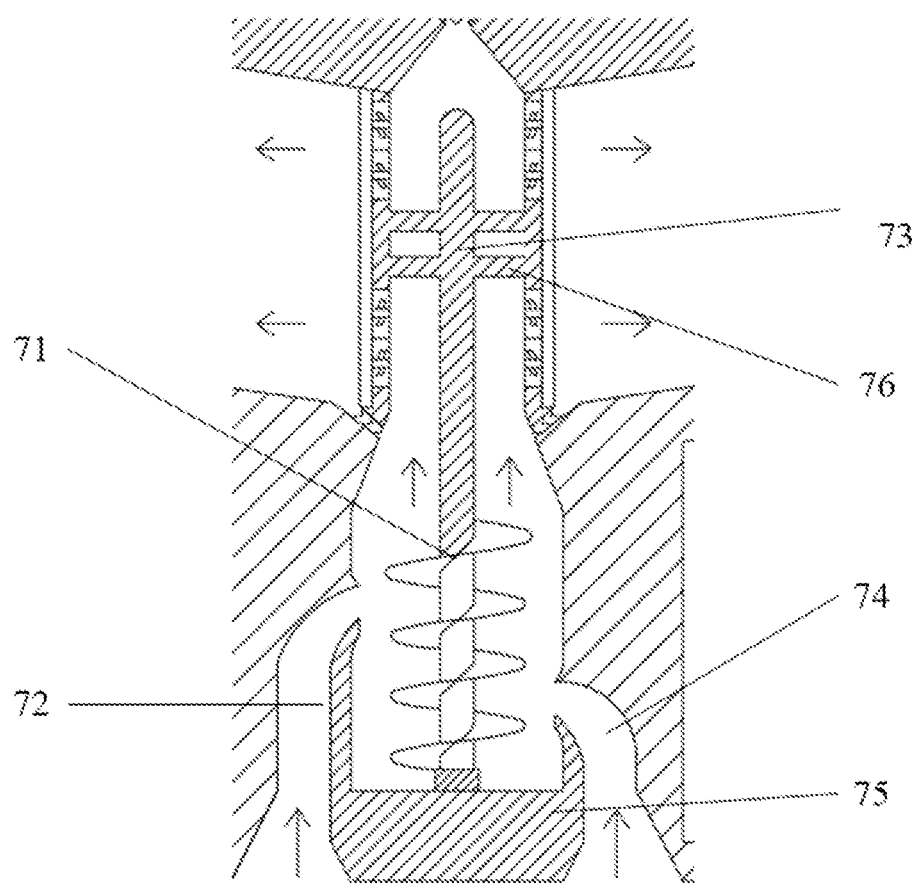
FIG. 11 is a schematic structural diagram of a gas-liquid chamber according to the present disclosure.

As shown in FIG. 11, the gas-liquid chamber 7 includes a left flow channel 72, a right flow channel 74, a fixed support 75, a separator driving device 71, and a concave-convex rotary disc bracket 73. The fixed support 75 is located at an entrance of the gas-liquid chamber 7 and the pump channel 8. The fixed support 75 divides the entrance into the left flow channel 72 and the right flow channel 74. Both the left flow channel 72 and the right flow channel 74 gradually shrink, and an exit of the left flow channel 72 is higher than an exit of the right flow channel 74. The exit of the left flow channel 72 points to a distant wall surface of the gas-liquid chamber 7 along a tangent direction of wall surface. The exit of the right flow channel 74 points to a near wall surface of the gas-liquid chamber 7 along the tangent direction of wall surface. One end of the separator driving device 71 is supported by the fixed support 75, and an other end of the separator driving device 71 is connected to the concave-convex rotary disc 68 through the concave-convex rotary disc bracket 73. The separator driving device 71 is a spiral separator. A plurality of winged flat plates 76 are arranged between the concave-convex rotary disc bracket 73 and the concave-convex rotary disc 68. The winged flat plates 76 are arranged in two layers vertically. In each layer, three winged flat plates 76 are arranged horizontally, and an angle of 120° is formed between every two of the three winged flat plates 76. A flow channel is formed between neighboring winged flat plates 76.

Figure 5:
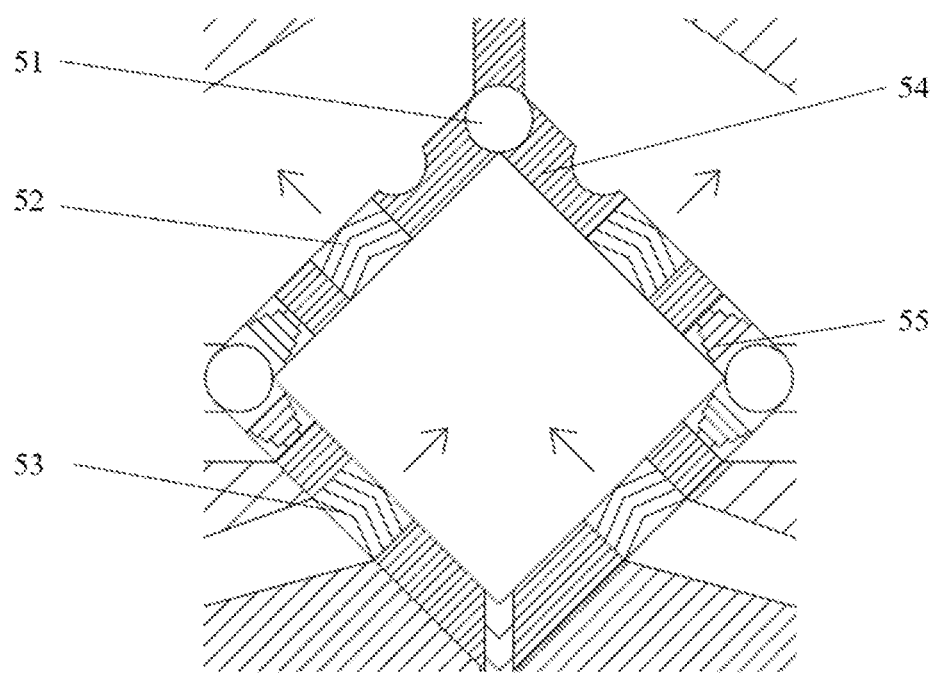
FIG. 5 is a schematic structural diagram of a secondary gas-liquid separation chamber according to the present disclosure.

As shown in FIG. 1 and FIG. 5, a cavity between an exterior of the secondary gas-liquid separation chamber 5 and the housing 1 is an air intake pipeline 4. The secondary gas-liquid separation chamber 5 includes a tetrahedron 54, a one-way intake valve 53, a shaft rod spring 55, a shaft rod rotor 51, and a one-way outlet valve 52. The secondary gas-liquid separation chamber 5 is tetrahedral. The tetrahedron 54 includes a first wall surface, a second wall surface, a third wall surface, and a fourth wall surface. The first wall surface is connected to the second wall surface through a first shaft rod rotor 51. The first shaft rod rotor 51 is connected to one end of the supporting connecting rod 3. The first wall surface is connected to the third wall surface through a second shaft rod rotor. The second wall surface is connected to the fourth wall surface through a third shaft rod rotor. A shaft rod spring 55 is arranged on each of two ends of the second shaft rod rotor and the third shaft rod rotor. The second shaft rod rotor and the third shaft rod rotor are respectively slidably mounted on fixed shaft rods 13 on two sides. A one-way intake valve 53 is arranged on each of the third wall surface and the fourth wall surface to communicate the primary gas-liquid separation chamber 6 with the secondary gas-liquid separation chamber 5. A one-way outlet valve 52 is arranged on each of the first wall surface and the second wall surface to communicate the secondary gas-liquid separation chamber 5 with the air intake pipeline 4. A wall surface of the tetrahedron 54 is provided with a tertiary discharge hole 14 for inputting a liquid separated in the secondary gas-liquid separation chamber 5 into the gas-liquid chamber 7 in a one-way manner. The cavity between the exterior of the secondary gas-liquid separation chamber 5 and the housing 1 is the air intake pipeline 4. The air intake pipeline 4 is communicated with the self-priming chamber 10 through a one-way channel 11.

Optionally, the first wall surface, the second wall surface, the third wall surface and the fourth wall surface of the tetrahedron 54 are of the same width, i.e., the cross-sectional area of the tetrahedron 54 is rhombic when no deformation occurs. A ratio of the length of the fixed shaft rod 13, the side length of the cross-section of the tetrahedron 54, and the length of the supporting connecting rod 3 is 1:2:2.5. The secondary gas-liquid separation chamber 5 is symmetrically arranged. Two one-way intake valves 53, two one-way outlet valves 52, two fixed shaft rods 13, and four shaft rod springs 55 are arranged.

Figure 3:
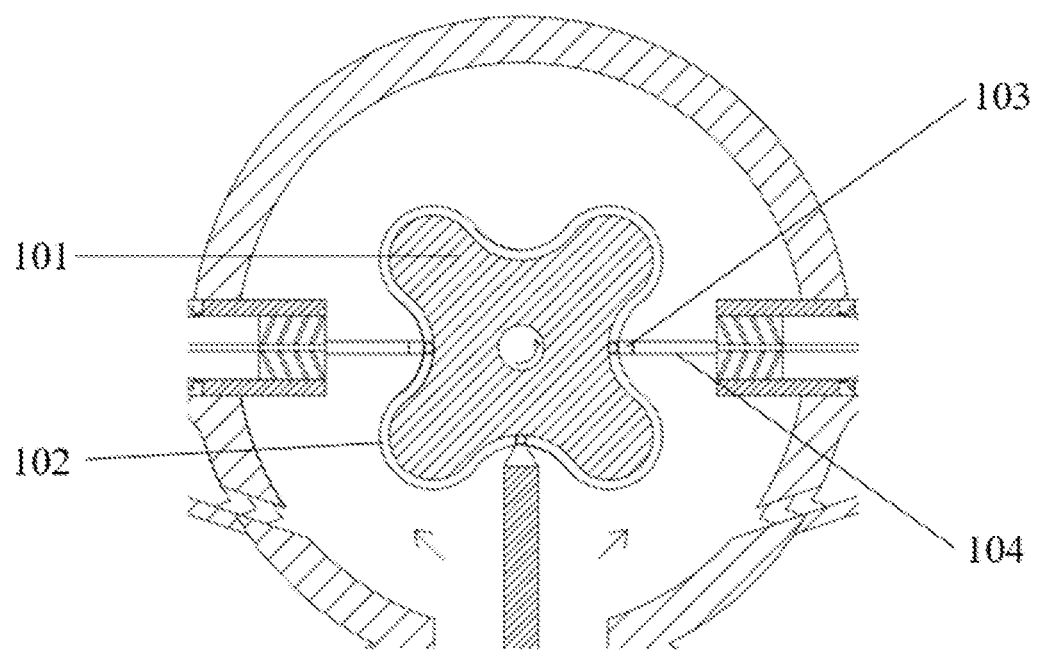
FIG. 3 is a schematic structural diagram of a self-priming chamber according to the present disclosure.
Figure 4:
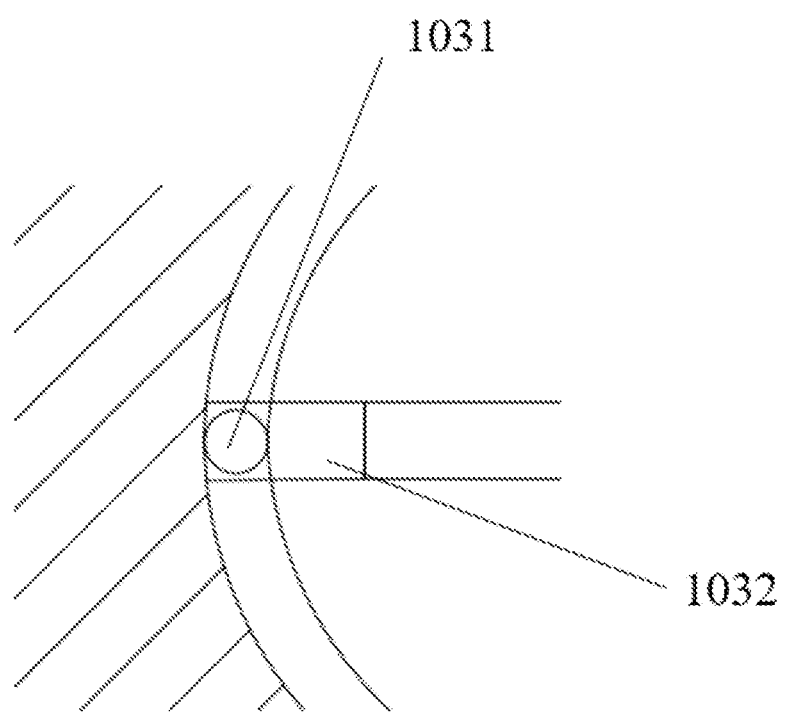
FIG. 4 is an enlarged structural diagram of a fixed hub device according to the present disclosure.

As shown in FIG. 1, FIG. 3, and FIG. 4, the self-priming chamber 10 includes a rotary cam 101, a cam slide rail 102, a fixed hub device 103, and a plate chamber connecting rod 104. The rotary cam 101 is located at a center of the self-priming chamber 10, the rotary cam 101 is square and has concave-convex edges, and the rotary cam 101 is driven by a power unit to rotate. The cam slide rail 102 is arranged on a contour of the rotary cam 101. An other end of the supporting connecting rod 3 is in contact with the rotary cam 101 through the fixed hub device 103. One end of the plate chamber connecting rod 104 is in contact with the rotary cam 101 through the fixed hub device 103. An other end of the plate chamber connecting rod 104 is connected to an exhaust device in the exhaust chamber 9, to drive the exhaust device to operate. The fixed hub device 103 includes a hub shell 1032 and a hub ball 1031. The hub ball 1031 is arranged in the hub shell 1032. The hub ball 1031 is located in the cam slide rail 102. The hub shell 1032 is configured for limiting a movement of the hub ball 1031 in the cam slide rail 102.

Figure 2:
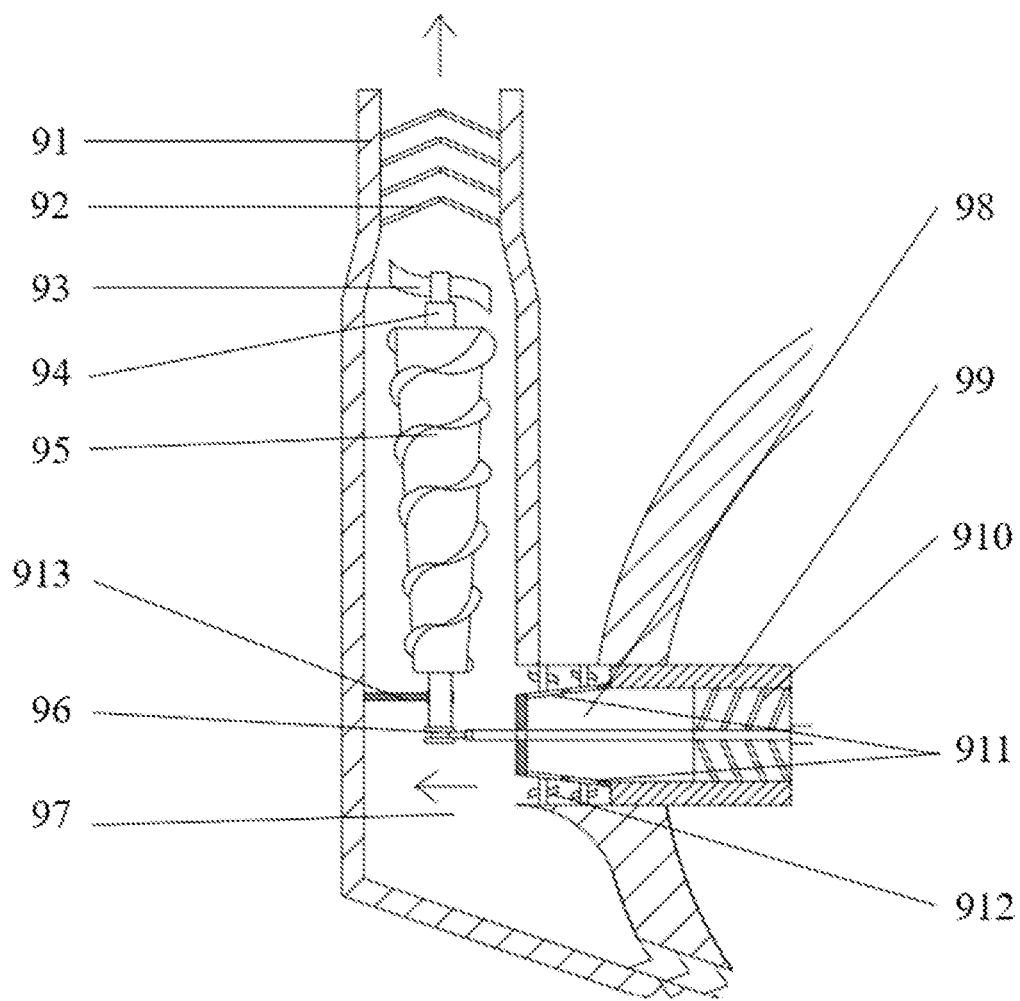
FIG. 2 is a schematic structural diagram of an exhaust chamber according to the present disclosure.

As shown in FIG. 2, the exhaust chambers 9 are symmetrically distributed on two sides of the self-priming chamber 10. The exhaust chamber 9 is L-shaped. The exhaust chamber 9 includes a communicating channel 99, an inlet check valve 910 of the exhaust chamber, an inner chamber 98 of the exhaust chamber, an outer chamber 97 of the exhaust chamber, an inner and outer chamber outlet impeller 912, an impeller separator connecting rod 94 of a trapezoidal gas-liquid separation device, a trapezoidal gas-liquid separator impeller 93, and an outlet check valve 92 of the exhaust chamber.

The communicating channel 99 is configured for communicating the self-priming chamber 10 with the outer chamber 97 of the exhaust chamber. A chamber in the communicating channel 99 is the inner chamber 98 of the exhaust chamber. A trapezoidal gas-liquid separator 95 is arranged in the outer chamber 97 of the exhaust chamber. The impeller separator connecting rod 94 is arranged in the trapezoidal gas-liquid separator 95. One end of the impeller separator connecting rod 94 is fixed to the trapezoidal gas-liquid separator impeller 93, and an other end of the impeller separator connecting rod 94 is supported in the outer chamber 97 of the exhaust chamber by a support base 913. The outlet check valve 92 of the exhaust chamber is arranged on a top of the exhaust chamber 9. An other end of the impeller separator connecting rod 94 is connected to an other end of the plate chamber connecting rod 104 through a crank-slider mechanism 96. The impeller separator connecting rod 94 is driven to rotate by reciprocation of the plate chamber connecting rod 104.

The plate chamber connecting rod 104 is movably mounted in the communicating channel 99. The inlet check valve 910 of the exhaust chamber is arranged in the inner chamber 98 of the exhaust chamber. The inlet check valve 910 of the exhaust chamber is mounted in the plate chamber connecting rod 104. The inlet check valve 910 of the exhaust chamber is opened or closed through reciprocation of the plate chamber connecting rod 104. The communicating channel 99 is provided with an inner and outer chamber outlet 911 communicated with the outer chamber 97 of the exhaust chamber. The inner and outer chamber outlet impeller 912 is mounted in the inner and outer chamber outlet 911.

A bottom of the outer chamber 97 of the exhaust chamber is provided with a quaternary discharge hole 2. The quaternary discharge hole 2 is configured for communicating the outer chamber 97 of the exhaust chamber with the self-priming chamber 10. A top end of an exhaust chamber outer wall surface 91 of the outer chamber 97 of the exhaust chamber gradually shrinks with a shrinkage angle of 15°. A tilt angle of a bottom of the exhaust chamber outer wall surface 91 relative to a horizontal plane is 30°. The trapezoidal gas-liquid separator 95 is tapered, and a taper angle of the trapezoidal gas-liquid separator 95 is 10°. Two side by side inner and outer chamber outlet impellers 912 are arranged in the inner and outer chamber outlet 911. A diameter ratio of the two inner and outer chamber outlet impellers 912 is 1:1.2.

The operation process of the present disclosure is as follows:

In an initial state, the fixed hub device 103 is located at the most concave part of the rotary cam 101. As the motor drives the rotary cam 101 to rotate counterclockwise, the inlet check valve 910 of the exhaust chamber connected to the plate chamber connecting rod 104 gradually moves from an outermost end of the exhaust chamber 9 toward an inner end of the exhaust chamber 9. In this case, the inlet check valve 910 of the exhaust chamber is in a closed state, the outlet check valve 92 of the exhaust chamber is in an on state, the volume in the exhaust chamber 9 gradually decreases, and gas and liquid in the exhaust chamber 9 are gradually squeezed out. After the rotary cam 101 rotates by 45°, the inlet check valve 910 of the exhaust chamber controlled by the plate chamber connecting rod 104 reaches a maximum displacement length, the fixed hub device 103 reaches the most convex part of the rotary cam 101, and gas and liquid in the exhaust chamber 9 are discharged to the maximum extent. As the rotary cam 101 continues to rotate, the inlet check valve 910 of the exhaust chamber controlled by the plate chamber connecting rod 104 gradually moves back. In this case, the inlet check valve 910 of the exhaust chamber is opened. Because the air pressure in the exhaust chamber 9 is low, gas and liquid in the self-priming chamber 10 continuously enter the exhaust chamber 9. After the rotary cam 101 continues to rotate by 45°, the inlet check valve 910 of the exhaust chamber moves back to the outermost end of the exhaust chamber 9, and the fixed hub device 103 moves back to the most concave part of the rotary cam 101. As such, one complete air suction and air exhaust process is completed. Because gas and liquid in the self-priming chamber 10 are sucked into the exhaust chamber 9, the pressure in the self-priming chamber 10 is reduced, so that gas and liquid in the air intake pipeline 4 enter the self-priming chamber 10, forming a pressure difference with the gas-liquid chamber 7, the primary gas-liquid separation chamber 6, and the secondary gas-liquid separation chamber 5, thereby greatly improving the efficiency of gas-liquid separation. In addition, when the rotary cam 101 rotates by one turn, the two exhaust chambers 9 complete a total of eight air suction and air exhaust processes, thereby greatly improving the self-priming efficiency of the device.

At the early stage of operation of the device, a gas-liquid mixture enters the gas-liquid chamber 7 through the pump channel 8. The gas-liquid mixture enters the gas-liquid chamber 7 respectively through the left flow channel 72 and the right flow channel 74, impacts spiral blades on two sides of the separator driving device 71, and causes the separator driving device 71 to rotate clockwise, to drive the concave-convex rotary disc 68 to rotate clockwise through the concave-convex rotary disc bracket 73. The gas-liquid mixture entering the gas-liquid chamber 7 enters the inner chamber 64 of the primary gas-liquid separation chamber through the disc outlet 69. The gas and liquid passing through the disc outlet 69 are disturbed by the rotary disc impeller 610, to reduce the impact damage caused by the high-speed gas-liquid flow on the inner chamber 64 of the primary gas-liquid separation chamber. When the device is in the initial state, the constriction/expansion tooth movement device 645 is located at the most concave part of the concave-convex rotary disc 68. As the concave-convex rotary disc 68 rotates clockwise, the constriction/expansion tooth movement peripheral spring 6452 is compressed, and the screw shaft 6454 moves upward and causes the spiral gas-liquid separator 641 to rotate clockwise. After the concave-convex rotary disc 68 rotates by 60°, the constriction/expansion tooth movement device 645 is in contact with the most convex part of the concave-convex rotary disc 68. In this case, the constriction/expansion tooth movement peripheral spring 6452 is compressed to the maximum extent, and the spiral gas-liquid separator 641 reaches a highest position. As the concave-convex rotary disc 68 continues to rotate, the constriction/expansion tooth movement peripheral spring 6452 is stretched to drive the spiral gas-liquid separator 641 to rotate back. After continuing to rotate by 60°, the concave-convex rotary disc 68 returns to the same state as the initial state. As such, one complete gas-liquid separation process is completed. The gas and liquid entering the inner chamber 64 of the primary gas-liquid separation chamber are cut by the rotation of the spiral gas-liquid separator 641, and the high-speed gas-liquid flow collides with the bent baffle 644 and is thus separated. The gas and liquid obtained through separation in the inner chamber 64 of the primary gas-liquid separation chamber enter the middle chamber 62 of the primary gas-liquid separation chamber through the air outlet 643 of the bent baffle. Similarly, the gas and liquid passing through the air outlet 643 of the bent baffle are disturbed by the impeller 642 of the bent baffle. The separated liquid accumulates at the bottom due to its high density and then enters the gas-liquid chamber 7 through the primary discharge hole 16 for gas-liquid separation again. As the concave-convex rotary disc 68 continues to rotate, gas and liquid in the middle chamber 62 of the primary gas-liquid separation chamber are discharged to the outer chamber 61 of the primary gas-liquid separation chamber under a pressure difference. The gas and liquid entering the outer chamber 61 of the primary gas-liquid separation chamber are separated by the rotation of the conical gas-liquid separator 612. The gas and liquid separated again enter the secondary gas-liquid separation chamber 5 through the one-way intake valve 53. The liquid obtained through separation in the outer chamber 61 of the primary gas-liquid separation chamber enters the inner chamber 64 of the primary gas-liquid separation chamber through the secondary discharge hole 15. As the rotary cam 101 rotates counterclockwise, the supporting connecting rod 3 drives an upper wall surface of the tetrahedron 54 to reciprocate periodically, and the gas and liquid in the secondary gas-liquid separation chamber 5 are separated by squeezing. When the most convex part of the rotary cam 101 moves to the supporting connecting rod 3, the secondary gas-liquid separation chamber 5 is compressed to the minimum volume, and the gas is completely exhausted through the one-way outlet valve 52. After the rotary cam 101 continues to rotate, the upper wall surface of the tetrahedron 54 is stretched, the volume of the secondary gas-liquid separation chamber 5 is increased, the one-way outlet valve 52 is closed, and the one-way intake valve 53 is opened, to suck gas and liquid from the outer chamber 61 of the primary gas-liquid separation chamber. After the rotary cam 101 rotates by 45°, one air suction and air exhaust process is completed. The separated liquid enters the gas-liquid chamber 7 through the tertiary discharge hole 14. The fluid passing through the secondary gas-liquid separation chamber 5 enters the self-priming chamber 10 through the air intake pipeline 4. The fluid entering the self-priming chamber 10 enters the inner chamber 98 of the exhaust chamber under the pressure of the exhaust chamber 9, is disturbed by the inner and outer chamber outlet impeller 912 in the inner and outer chamber outlet 911, and then enters the outer chamber 97 of the exhaust chamber. Along with the counterclockwise rotation of the rotary cam 101, the plate chamber connecting rod 104 drives the crank-slider mechanism 96 to rotate, so as to drive the trapezoidal gas-liquid separator 95 for gas-liquid separation. The separated gas is disturbed by the trapezoidal gas-liquid separator impeller 93 and slowed down, and then discharged through the outlet check valve 92 of the exhaust chamber. The gas-liquid mixture that has not been completely separated flows into the self-priming chamber 10 through the quaternary discharge hole 2 for gas-liquid separation again.

At the later stage of operation of the device, there is no gas in the pump channel 8, a large amount of liquid enters the device, and the water level in the device gradually increases. When the water level rises to the self-priming chamber 10, the motor is turned off, the rotary cam 101 stops rotating, the pressure difference between the upper and lower parts of the device disappears, and the air intake pipeline 4 is closed, to prevent air in the exhaust chamber 9 and the self-priming chamber 10 from flowing back into the device.

It should be understood that although this specification is described in accordance with various embodiments, it does not mean that each embodiment only contains an independent technical solution. The description in the specification is only for clarity, and those skilled in the art should regard the specification as a whole, and the technical solutions in the embodiments can also be appropriately combined to form other implementations that can be understood by those skilled in the art.

The detailed descriptions listed above are merely specific illustrations of feasible embodiments of the present disclosure, and the protection scope of the present disclosure is not limited thereto. Equivalent embodiments or changes can be made without departing from the technical spirit of the present disclosure, which are all embraced in the protection scope of the present disclosure.

What is claimed is:

1. A driven gas-liquid separation starting device, wherein a gas-liquid chamber, a primary gas-liquid separation chamber, a secondary gas-liquid separation chamber and a self-priming chamber are arranged in a housing and communicated in sequence, wherein
the gas-liquid chamber is communicated with a pump channel, a rotation mechanism is arranged in the gas-liquid chamber, the rotation mechanism is driven by a mixed gas-liquid fluid in the pump channel to rotate; a second cam mechanism is arranged in the primary gas-liquid separation chamber, the second cam mechanism is connected to an output shaft of the rotation mechanism, the primary gas-liquid separation chamber is divided by a baffle of the primary gas-liquid separation chamber and the second cam mechanism into a plurality of primary gas-liquid separation units, a plurality of spiral gas-liquid separation mechanisms in contact with the second cam mechanism are arranged in each of the primary gas-liquid separation units, the spiral gas-liquid separation mechanisms are driven by rotation of the second cam mechanism to cut the mixed gas-liquid fluid;
a first cam mechanism is arranged in the self-priming chamber, the secondary gas-liquid separation chamber is in contact with a rolling pair of the first cam mechanism through a supporting connecting rod, a volume of the secondary gas-liquid separation chamber is changed by rotation of the first cam mechanism, to carry out further gas-liquid separation on the mixed gas-liquid fluid with a high gas content obtained through separation in the primary gas-liquid separation chamber; and an exhaust chamber for exhausting gas is arranged on the self-priming chamber.

2. The driven gas-liquid separation starting device according to claim 1, wherein the primary gas-liquid separation units comprise an inner chamber of the primary gas-liquid separation chamber, a middle chamber of the primary gas-liquid separation chamber and an outer chamber of the primary gas-liquid separation chamber; the middle chamber of the primary gas-liquid separation chamber is spaced apart from the outer chamber of the primary gas-liquid separation chamber by an inner wall of the primary gas-liquid separation chamber, the inner chamber of the primary gas-liquid separation chamber is defined in the middle chamber of the primary gas-liquid separation chamber by a bent baffle; the bent baffle is provided with an air outlet of the bent baffle for communicating the inner chamber of the primary gas-liquid separation chamber with the middle chamber of the primary gas-liquid separation chamber; the inner wall of the primary gas-liquid separation chamber is provided with an air outlet for communicating the middle chamber of the primary gas-liquid separation chamber with the outer chamber of the primary gas-liquid separation chamber; the outer chamber of the primary gas-liquid separation chamber is communicated with the secondary gas-liquid separation chamber;

the second cam mechanism comprises a concave-convex rotary disc, the concave-convex rotary disc is connected to the output shaft of the rotation mechanism, the concave-convex rotary disc is provided with a disc outlet for communicating the gas-liquid chamber with the inner chamber of the primary gas-liquid separation chamber; a slide rail of the concave-convex rotary disc is arranged on an outer contour of the concave-convex rotary disc; one end of the bent baffle is mounted in the slide rail of the concave-convex rotary disc through a slide rail device of the bent baffle;

the spiral gas-liquid separation mechanism is arranged at a middle portion of the inner chamber of the primary gas-liquid separation chamber adjacent to the concave-convex rotary disc; the spiral gas-liquid separation mechanism comprises a spiral gas-liquid separator and a constriction/expansion tooth movement device; the constriction/expansion tooth movement device comprises a balance plate, a constriction/expansion tooth movement peripheral spring, a constriction/expansion tooth movement fixed support and a balance plate ball; the constriction/expansion tooth movement fixed support is fixed on an inner wall surface of the inner chamber of the primary gas-liquid separation chamber; a screw shaft of the spiral gas-liquid separator is engaged with a screw pair of the constriction/expansion tooth movement fixed support; a bottom of the screw shaft is in contact with a contour of the concave-convex rotary disc; a bottom of the constriction/expansion tooth movement fixed support is connected to one end of the constriction/expansion tooth movement peripheral spring; an other end of the constriction/expansion tooth movement peripheral spring is fixed to the balance plate, the balance plate is mounted on the screw shaft through the balance plate ball.

3. The driven gas-liquid separation starting device according to claim 2, wherein the slide rail device of the bent baffle comprises a spring of the bent baffle, a damping telescopic rod, a slide rail support of the bent baffle and a slide rail ball of the bent baffle, the damping telescopic rod is mounted on one end of the bent baffle, a rod head of the damping telescopic rod is in contact with the slide rail support of the bent baffle, the slide rail ball of the bent baffle is arranged at a bottom of the slide rail support of the bent baffle, the slide rail ball of the bent baffle is located inside the slide rail of the concave-convex rotary disc, and the slide rail support of the bent baffle is configured to limit a movement of the slide rail ball of the bent baffle in the slide rail of the concave-convex rotary disc; the spring of the bent baffle is located between the bent baffle and the slide rail support of the bent baffle;

one end of the baffle of the primary gas-liquid separation chamber is connected to the housing, an other end of the baffle of the primary gas-liquid separation chamber is connected to a baffle spring of the primary gas-liquid separation chamber, a bottom of the baffle spring of the primary gas-liquid separation chamber is connected to a disc slide rail ball, the disc slide rail ball is located inside the slide rail of the concave-convex rotary disc, and a movement of the disc slide rail ball in the slide rail of the concave-convex rotary disc is limited by a limit plate.

4. The driven gas-liquid separation starting device according to claim 2, wherein the gas-liquid chamber comprises a left flow channel, a right flow channel, a fixed support, a separator driving device and a concave-convex rotary disc bracket, the fixed support is located at an entrance of the gas-liquid chamber and the pump channel, the fixed support divides the entrance into the left flow channel and the right flow channel, both the left flow channel and the right flow channel gradually shrink, and an exit of the left flow channel is higher than an exit of the right flow channel, the exit of the left flow channel points to a distant wall surface of the gas-liquid chamber along a tangent direction of a wall surface, the exit of the right flow channel points to a near wall surface of the gas-liquid chamber along the tangent direction of the wall surface, one end of the separator driving device is supported by the fixed support, an other end of the separator driving device is connected to the concave-convex rotary disc through the concave-convex rotary disc bracket; the separator driving device is a spiral separator.

5. The driven gas-liquid separation starting device according to claim 2, wherein the primary gas-liquid separation unit further comprises a primary discharge hole, a secondary discharge hole, a rotary disc impeller and a conical gas-liquid separator;

the primary discharge hole is located between the gas-liquid chamber and the inner chamber of the primary gas-liquid separation chamber, and the primary discharge hole is configured for inputting a liquid separated in the inner chamber of the primary gas-liquid separation chamber into the gas-liquid chamber in a one-way manner;

the secondary discharge hole is located between the outer chamber of the primary gas-liquid separation chamber and the middle chamber of the primary gas-liquid separation chamber, and the secondary discharge hole is configured for inputting a liquid separated in the middle chamber of the primary gas-liquid separation chamber into the outer chamber of the primary gas-liquid separation chamber in a one-way manner;

the conical gas-liquid separator is mounted in the outer chamber of the primary gas-liquid separation chamber through a support of the conical gas-liquid separator, and the conical gas-liquid separator is adjacent to the air outlet; the rotary disc impeller is arranged in the disc outlet; and an impeller of the bent baffle is arranged in the air outlet of the bent baffle.

6. The driven gas-liquid separation starting device according to claim 5, wherein a blade of the spiral gas-liquid separator exhibits a tendency of expanding first and then constricting, and an expansion angle and a constriction angle of the blade are both 30°; and a shrinkage angle of a blade of the conical gas-liquid separator is 50°.

7. The driven gas-liquid separation starting device according to claim 1, wherein a cavity between an exterior of the secondary gas-liquid separation chamber and the housing is an air intake pipeline; the secondary gas-liquid separation chamber comprises a tetrahedron, a one-way intake valve, a shaft rod spring, a shaft rod rotor and a one-way outlet valve, the secondary gas-liquid separation chamber is tetrahedral, the tetrahedron comprises a first wall surface, a second wall surface, a third wall surface and a fourth wall surface, the first wall surface is connected to the second wall surface through a first shaft rod rotor, the first shaft rod rotor is connected to one end of the supporting connecting rod, the first wall surface is connected to the third wall surface through a second shaft rod rotor, the second wall surface is connected to the fourth wall surface through a third shaft rod rotor, the shaft rod spring is arranged on each of two ends of the second shaft rod rotor and the third shaft rod rotor, the second shaft rod rotor and the third shaft rod rotor are respectively slidably mounted on fixed shaft rods on two sides; the one-way intake valve is arranged on each of the third wall surface and the fourth wall surface to communicate the primary gas-liquid separation chamber with the secondary gas-liquid separation chamber; the one-way outlet valve is arranged on each of the first wall surface and the second wall surface to communicate the secondary gas-liquid separation chamber with the air intake pipeline; a wall surface of the tetrahedron is provided with a tertiary discharge hole for inputting a liquid separated in the secondary gas-liquid separation chamber into the gas-liquid chamber in a one-way manner; the cavity between the exterior of the secondary gas-liquid separation chamber and the housing is the air intake pipeline, the air intake pipeline is communicated with the self-priming chamber through a one-way channel.

8. The driven gas-liquid separation starting device according to claim 1, wherein the self-priming chamber comprises a rotary cam, a cam slide rail, a fixed hub device and a plate chamber connecting rod;
the rotary cam is located at a center of the self-priming chamber, the rotary cam is driven by a power unit to rotate; the cam slide rail is arranged on a contour of the rotary cam; an other end of the supporting connecting rod is in contact with the rotary cam through the fixed hub device, one end of the plate chamber connecting rod is in contact with the rotary cam through the fixed hub device, an other end of the plate chamber connecting rod is connected to an exhaust device in the exhaust chamber, to drive the exhaust device to operate;
the fixed hub device comprises a hub shell and a hub ball, the hub ball is arranged in the hub shell, the hub ball is located in the cam slide rail, and the hub shell is configured for limiting a movement of the hub ball in the cam slide rail.

9. The driven gas-liquid separation starting device according to claim 8, wherein the exhaust chambers are symmetrically distributed on two sides of the self-priming chamber, the exhaust chamber is L-shaped, the exhaust chamber comprises a communicating channel, an inlet check valve of the exhaust chamber, an inner chamber of the exhaust chamber, an outer chamber of the exhaust chamber, an inner and outer chamber outlet impeller, an impeller separator connecting rod of a trapezoidal gas-liquid separation device, a trapezoidal gas-liquid separator impeller and an outlet check valve of the exhaust chamber;
the communicating channel is configured for communicating the self-priming chamber with the outer chamber of the exhaust chamber, a chamber in the communicating channel is the inner chamber of the exhaust chamber, a trapezoidal gas-liquid separator is arranged in the outer chamber of the exhaust chamber, the impeller separator connecting rod is arranged in the trapezoidal gas-liquid separator, one end of the impeller separator connecting rod is fixed to the trapezoidal gas-liquid separator impeller, an other end of the impeller separator connecting rod is supported in the outer chamber of the exhaust chamber by a support base; the outlet check valve of the exhaust chamber is arranged on a top of the exhaust chamber; an other end of the impeller separator connecting rod is connected to an other end of the plate chamber connecting rod through a crank-slider mechanism, the impeller separator connecting rod is driven to rotate by reciprocation of the plate chamber connecting rod;
the plate chamber connecting rod is movably mounted in the communicating channel, the inlet check valve of the exhaust chamber is arranged in the inner chamber of the exhaust chamber, and the inlet check valve of the exhaust chamber is mounted in the plate chamber connecting rod, the inlet check valve of the exhaust chamber is opened or closed through reciprocation of the plate chamber connecting rod; the communicating channel is provided with an inner and outer chamber outlet communicated with the outer chamber of the exhaust chamber, and the inner and outer chamber outlet impeller is mounted in the inner and outer chamber outlet.

10. The driven gas-liquid separation starting device according to claim 9, wherein a bottom of the outer chamber of the exhaust chamber is provided with a quaternary discharge hole, the quaternary discharge hole is configured for communicating the outer chamber of the exhaust chamber with the self-priming chamber; a top end of an exhaust chamber outer wall surface of the outer chamber of the exhaust chamber gradually shrinks with a shrinkage angle of 15°; a tilt angle of a bottom of the exhaust chamber outer wall surface relative to a horizontal plane is 30°; the trapezoidal gas-liquid separator is tapered, and a taper angle of the trapezoidal gas-liquid separator is 10°.

\* \* \* \* \*